(12) United States Patent
Mola et al.

(10) Patent No.: US 8,894,290 B2
(45) Date of Patent: Nov. 25, 2014

(54) RETAINING CAGE FOR THE ROLLING ELEMENTS OF A ROLLING-CONTACT BEARING

(71) Applicants: Roberto Mola, Turin (IT); Riccardo Restivo, Turin (IT); Gianpiero Scaltriti, Turin (IT)

(72) Inventors: Roberto Mola, Turin (IT); Riccardo Restivo, Turin (IT); Gianpiero Scaltriti, Turin (IT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 13/864,434

(22) Filed: Apr. 17, 2013

(65) Prior Publication Data

US 2013/0272640 A1    Oct. 17, 2013

(30) Foreign Application Priority Data

Apr. 17, 2012  (IT) ............ TO2012A000334

(51) Int. Cl.
*F16C 33/38* (2006.01)
*F16C 33/46* (2006.01)
*F16C 33/41* (2006.01)
*F16C 19/52* (2006.01)

(52) U.S. Cl.
CPC ............ *F16C 33/3887* (2013.01); *F16C 33/46* (2013.01); *F16C 33/38* (2013.01); *F16C 33/416* (2013.01); *F16C 19/527* (2013.01)
USPC .......................................... 384/523; 384/614

(58) Field of Classification Search
CPC .... F16C 33/3887; F16C 33/46; F16C 33/416; F16C 33/418; F16C 33/467; F16C 19/527
USPC ................. 384/470, 523, 572, 614, 621, 623
See application file for complete search history.

(56) References Cited

U.S. PATENT DOCUMENTS

| | | | | |
|---|---|---|---|---|
| 3,918,778 A * | 11/1975 | Jacobson et al. | ............ | 384/523 |
| 4,040,686 A * | 8/1977 | F'Geppert | ...................... | 384/527 |
| 5,199,799 A * | 4/1993 | Masuda et al. | ................ | 384/470 |
| 5,941,704 A * | 8/1999 | Arai et al. | ...................... | 433/114 |
| 6,102,822 A | 8/2000 | Nakazeki | | |
| 6,261,004 B1 | 7/2001 | Tsujimoto et al. | | |
| 6,837,624 B2 * | 1/2005 | Buard et al. | .................. | 384/523 |
| 2002/0032064 A1* | 3/2002 | Sone et al. | .................... | 464/145 |
| 2006/0018581 A1* | 1/2006 | Buckman et al. | ............. | 384/523 |

FOREIGN PATENT DOCUMENTS

| | | |
|---|---|---|
| DE | 102009024681 A1 | 12/2010 |
| DE | 102010018653 A1 | 11/2011 |
| JP | 2006105273 A  * | 4/2006 |
| WO | WO0042329 A1 | 7/2000 |
| WO | WO2011067173 A1 | 6/2011 |

* cited by examiner

*Primary Examiner* — Marcus Charles
(74) *Attorney, Agent, or Firm* — Bryan Peckjian; SKF USA Inc. Patent Department

(57) ABSTRACT

A retaining cage for the rolling elements of a rolling-contact bearing, having an annular body featuring seven pockets capable of restraining seven respective rolling elements of a rolling-contact bearing, the rolling elements being spaced apart around a center (O) of the cage, the pockets being spaced from one another according to the following values of angular spacing between two consecutive pockets: 48.3°; 48.5°; 51.2°; 51.8°; 53°; 53.5°; 53.7°.

2 Claims, 2 Drawing Sheets

RETAINING CAGE FOR THE ROLLING ELEMENTS OF A ROLLING-CONTACT BEARING

CROSS-REFERENCE TO RELATED APPLICATION

This application claims priority to Italian Patent Application No. TO2012A000334 filed on Apr. 17, 2012, the contents of which are fully incorporated herein by reference.

FIELD OF THE INVENTION

The present invention refers to a retaining cage for the rolling elements of a rolling-contact bearing; more particularly, the invention refers to a cage capable of restraining the rolling elements of a rolling-contact bearing spaced at various predetermined distances.

BACKGROUND OF THE INVENTION

Traditionally, retaining cages are used for restraining the rolling elements (balls, taper rollers or other rolling elements) regularly spaced equidistantly along the raceways of a rolling-contact bearing.

An equidistant arrangement of the rolling elements favours uniform distribution of the contact pressures, and therefore of the overall stresses acting on a bearing, favouring its regular operation, to the advantage of the useful life of the bearing. In general, as the rolling elements get closer together, the specific contact pressure that they exert against the raceways diminishes, and vice versa.

For a constant relative speed of rotation between the outer and inner rings, equal spacing of the rolling elements means that the various rolling elements move at a regular and equal frequency past a given point taken as reference along one of the rings of the bearing. If the frequency of the passing of the various rolling elements comes into resonance with a natural frequency of the bearing or of other bodies to which the bearing is fixed, in certain cases an undesired noise is generated which increases progressively, becoming unacceptable in certain cases.

There is an ever increasing tendency, in certain sectors of the art, towards a reduction in vibrations and better acoustic quality, for example in the domestic electrical appliances sector. To obviate the disadvantage mentioned above, restraining cages have been proposed having pockets with differentiated and irregular angular distribution, in order to obtain better performance from the bearing in terms of smaller vibrations.

There is known from document WO 00/42329 A1 a rolling-contact bearing provided with a retaining cage capable of restraining the rolling elements spaced apart by angular distances which are different from one another.

An intrinsic disadvantage of the solution according to the known art mentioned above, which provides for the introduction of irregularity in the distances between rolling elements, is caused by the fact that precisely these irregularities generate imbalances in the forces and reactions exchanged by the bearing with the components connected to it. In other cases, the irregular distribution gives rise to excessively high peaks in the specific contact pressures, inevitably shortening the useful life of the bearing.

The present invention is therefore tasked with the object of creating a retaining cage of the type specified above in which the aforesaid qualities of quietness and absence of resonance are conserved, eliminating at the same time the negative phenomena associated with imbalances of forces and pressure peaks.

SUMMARY OF THE INVENTION

According to the present invention, this object is achieved thanks to a cage having the characteristics recited in the attached claims. In summary, the spacing between the pockets is optimized without appreciably altering the loading capacity of the bearing.

BRIEF DESCRIPTION OF THE DRAWINGS

A cage according to the invention will now be described making reference to the attached drawings, in which.

DETAILED DESCRIPTION OF THE INVENTION

Figure 2:
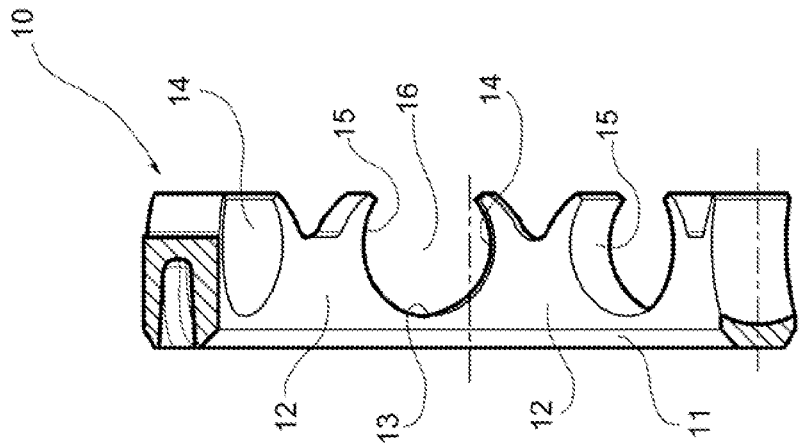
FIG. 2 is a view in section along the line II-II in FIG. 1.
Figure 1:
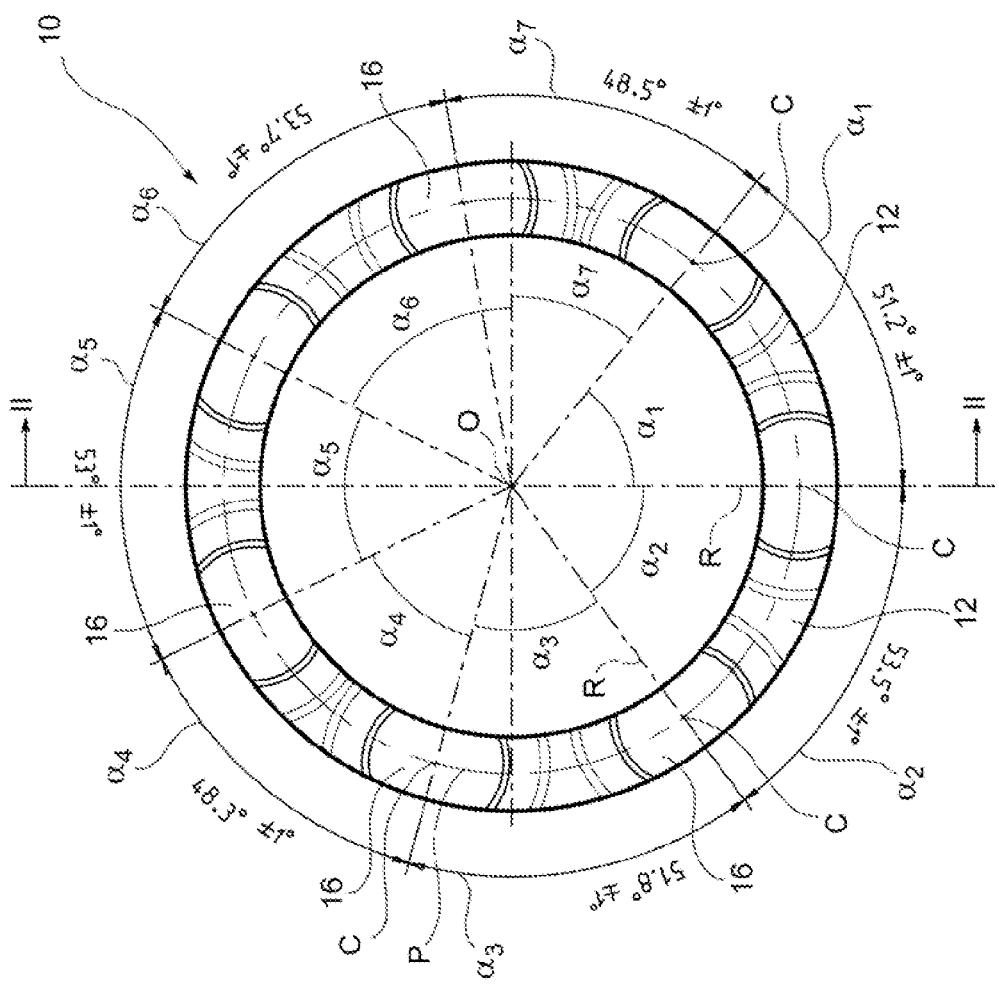
FIG. 1 is a view on plan of a cage according to the invention.

Referring initially to FIGS. 1 and 2, a cage according to the present invention is indicated in its entirety with the reference number 10. The cage 10 features a body of annular form comprising an annular rib 11 at the base, and a plurality of retaining elements 12 which project from the same side of the annular rib 11. The annular rib 11 and the retaining elements 12 have partially spherical concave surfaces 13, 14, 15, which together define a plurality of pockets or partially spherical cavities 16 capable of restraining the balls (not illustrated) of a rolling-contact bearing, suitably spaced, as explained below, along a primitive circumference P passing through the centres of the balls. In the example illustrated (FIG. 2), in a manner itself known, the retaining elements 12 each feature two diverging curved arms (not numbered). The concave surfaces 13, 14, 15 of each pocket together cover an arc which extends for more than 180° around each ball.

In the present illustrated example, the drawing shows the cage 10 for a rolling-contact bearing whose rolling elements are balls, and for this reason the pockets 16 are spherical. The invention is not to be understood to be limited to the specific spherical shape of the rolling elements (and therefore of the pockets). The cage may alternatively be configured with pockets conformed for example for restraining conical or cylindrical rolling elements, or of yet other shapes.

The cage illustrated in FIGS. 1 and 2 comprises a total of seven pockets.

The spacing between two consecutive pockets 16 is defined by the angles $\alpha_1$-$\alpha_7$ as illustrated in FIG. 1. With R indicating the radius which defines the distance between the origin or centre O of the cage and the geometrical centre C of each pocket 16, the distance or angular spacing between two consecutive pockets can be calculated. The seven angles $\alpha_1$-$\alpha_7$ have different values which entail different and irregular intervals between the various rolling elements fitted to the pockets of the cage.

The maximum difference in spacing between the pockets must not exceed 6°.

The optimum values for angular spacing between the pockets are as follows: 48.3°; 48.5°; 51.2°; 51.8°; 53°; 53.5°; 53.7°.

Considering a circumferential direction along the cage, the seven pockets are spaced from each other according to the following sequence of spacing angles:

$\alpha 1 = 51.2°$
$\alpha 2 = 53.5°$
$\alpha 3 = 51.8°$
$\alpha 4 = 48.3°$
$\alpha 5 = 53°$
$\alpha 6 = 53.7°$
$\alpha 7 = 48.5°$.

Without wishing to be tied to a specific theory on the matter, the experimental tests carried out by the Applicant have demonstrated that a cage like the one illustrated in FIGS. 1 and 2 has shown excellent results in terms of quietness and absence of resonance. The experiments conducted by the Applicant have also demonstrated that, due to the particular differentiated spacing indicated above, the result obtained is that the alteration in contact loading, compared with a traditional bearing with equidistant angular spacing, is contained within +/−1%.

The cage of the present invention therefore does not significantly alter the useful life under load of the bearing, compared with an identical rolling-contact bearing with a traditional cage with equidistantly spaced pockets.

Figure 3:
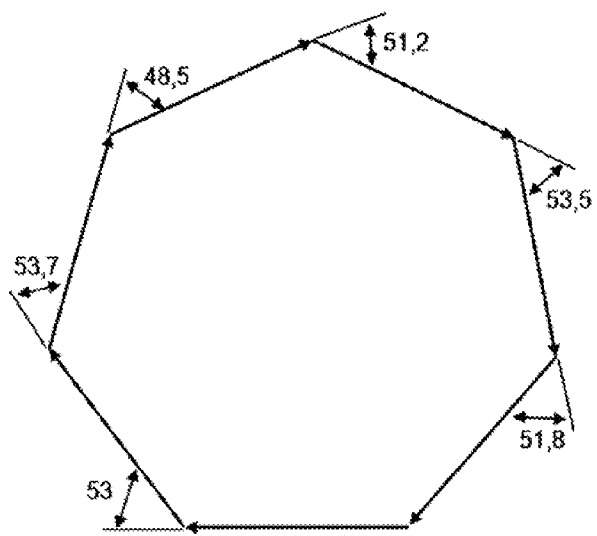
FIG. 3 is a diagram illustrating the vectorial sum of centrifugal forces exchanged between the rolling elements and the raceways of a rolling-contact bearing equipped with a cage according to the present invention.
Figure 4:
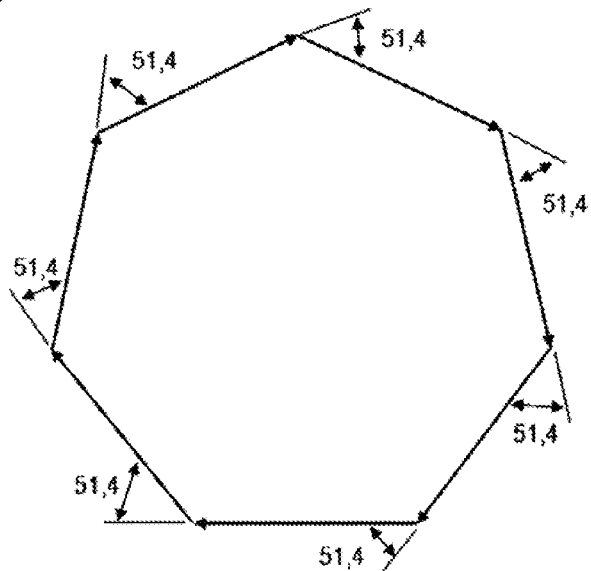
FIG. 4 is a diagram, similar to the diagram in FIG. 3, obtained in a rolling-contact bearing provided with a traditional cage with equidistantly-spaced pockets.

The resultant of the centrifugal forces measured on the balls, as appears from the diagram indicated in FIG. 3, is almost nil. The imbalance found also with reference to the diagram (FIG. 4), obtained by measuring the centrifugal forces generated by seven balls housed in a traditional retaining cage with pockets equidistantly spaced at a constant angle of 51.4°, is of such a small size as not to have the slightest effect on the performance of the bearing. In these diagrams the vectors of the forces give rise to a (closed) polygonal line. It follows from this that a rolling-contact bearing equipped with a cage like the one in FIGS. 1 and 2 exhibits ideal balance and does not alter the loading capacity of the bearing compared with what is obtainable with a cage with equidistantly spaced pockets.

Figure 5:
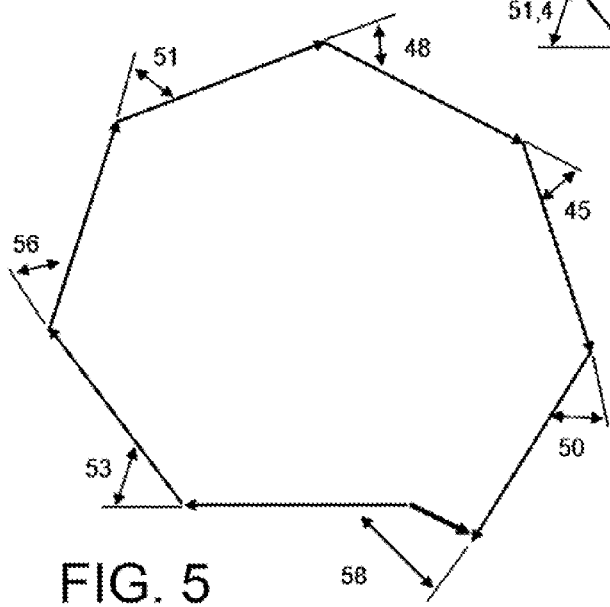
FIG. 5 is a diagram, similar to the diagrams in FIGS. 3 and 4, obtained in a rolling-contact bearing provided with a traditional cage with non-equidistantly-spaced pockets, different from the present invention.

By way of comparison, FIG. 5 represents a diagram which shows the vectorial centrifugal forces generated by balls restrained by a cage with seven pockets, not equally spaced, having the following (angular) values: 53°, 56°, 51°, 48°, 45°, 50°, 58°. As may be noted from the diagram in FIG. 5, the vectorial sum of the centrifugal forces produces an open broken line with a resultant force F of disequilibrium, which has been shown to be deleterious for the purposes of noise and of the bearing's durability or useful life under load.

The invention claimed is:

1. A retaining cage for rolling elements of a rolling bearing, the retaining cage comprising:
    an annular body providing a plurality of pockets for retaining a respective plurality of rolling elements of a bearing spaced around a center of a cage, the pockets being spaced according to respective values of angular spacings which are different from one another with respect to the center of the cage, and wherein
    the cage includes a total of seven pockets which are spaced according to the following values of the angular spacings between two consecutive pockets: 48.3°, 48.5°, 51.2°, 51.8°, 53°, 53.5°, 53.7°.

2. The retaining cage according to claim 1, wherein in a circumferential direction along the cage, the seven pockets are spaced from one another according to the following sequence of angular spacings: 51.2°, 53.5°, 51.8°, 48.3°, 53°, 53.7°, and 48.5°.

* * * * *